United States Patent
Lindheimer et al.

(10) Patent No.: US 12,232,205 B2
(45) Date of Patent: Feb. 18, 2025

(54) RELEASE CAUSE FOR TRANSITION FROM CONNECTED STATE

(71) Applicant: TELEFONAKTIEBOLAGET LM ERICSSON (PUBL), Stockholm (SE)

(72) Inventors: Christofer Lindheimer, Linköping (SE); Malik Wahaj Arshad, Stockholm (SE); Icaro L. J. da Silva, Stockholm (SE); Gunnar Mildh, Sollentuna (SE); Riikka Susitaival, Jorvas (FI)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 18/334,749

(22) Filed: Jun. 14, 2023

(65) Prior Publication Data

US 2023/0328838 A1 Oct. 12, 2023

Related U.S. Application Data (63) Continuation of application No. 17/704,198, filed on Mar. 25, 2022, now Pat. No. 11,723,108, which is a continuation of application No. 16/964,301, filed as application No. PCT/IB2019/053876 on May 10, 2019, now Pat. No. 11,317,463.

(60) Provisional application No. 62/669,804, filed on May 10, 2018.

(51) Int. Cl.
*H04W 76/27* (2018.01)
*H04W 76/28* (2018.01)

(52) U.S. Cl.
CPC .................................. *H04W 76/27* (2018.02)

(58) Field of Classification Search
CPC ..... H04W 76/27; H04W 76/28; H04W 76/30; H04W 76/34; H04B 7/18539; Y02D 30/70
See application file for complete search history.

(56) References Cited

U.S. PATENT DOCUMENTS

| | | | |
|---|---|---|---|
| 11,317,463 B2 | 4/2022 | Lindheimer et al. | |
| 11,723,108 B2 * | 8/2023 | Lindheimer | H04W 76/27 370/329 |
| 2017/0332419 A1 | 11/2017 | Kim et al. | |
| 2018/0270894 A1 | 9/2018 | Park et al. | |

(Continued)

FOREIGN PATENT DOCUMENTS

| | | |
|---|---|---|
| CN | 103858513 A | 6/2014 |
| EP | 2645806 A1 | 10/2013 |

OTHER PUBLICATIONS

"CR on Connection Control ([101#37][NR] RRC procedures/ messages)", TSG-RAN WG2 Meeting #101bis, Sanya, P.R. of China, Apr. 16-20, 2018, Based on Draft TS 38.331 V15.1.0 V15, pp. 1-305, 3GPP.

(Continued)

*Primary Examiner* — Andrew Wendell (57) ABSTRACT

Systems, methods, and apparatus for handling communications relating to suspending a user equipment in a radio access network (RAN) are disclosed. An example method includes the user equipment receiving a radio resource control (RRC) release message from a network node. The user equipment determines that the RRC release message includes a suspend configuration field. The user equipment applies delta signalling corresponding to a suspend configuration indicated by the suspend configuration field and transitions to an inactive state.

20 Claims, 5 Drawing Sheets

(56) References Cited

U.S. PATENT DOCUMENTS

| | | |
|---|---|---|
| 2019/0021058 A1 | 1/2019 | Cheng et al. |
| 2019/0150221 A1 | 5/2019 | Tseng et al. |
| 2019/0215800 A1 | 7/2019 | Fujishiro et al. |
| 2021/0250825 A1 | 8/2021 | Purkayastha et al. |
| 2023/0070195 A1 | 3/2023 | Li |

OTHER PUBLICATIONS

Ericsson, "UE identifier in Re-establishment request", 3GPP TSG-RAN WG2 #101Bis, Sanya, P.R. of China, Apr. 16-20, 2018, pp. 1-4, R2-1805631, 3GPP.

RAN2 Chairman (Intel), "Chairman Notes", 3GPP TSG-RAN WG2 Meeting #101bis, Sanya, China, Apr. 16 -20, 2018, pp. 1-133, 3GPP.

3GPP, "3rd Generation Partnership Project; Technical Specification Group Radio Access Network; NR; Radio Resource Control (RRC) protocol specification (Release 15)", Technical Specification, Mar. 2018, pp. 1-268, 3GPP TS 38.331 V15.1.0, Sophia Antipolis, Valbonne, France.

\* cited by examiner

RELEASE CAUSE FOR TRANSITION FROM CONNECTED STATE

This application is a continuation of U.S. application Ser. No. 17/704,198, filed Mar. 25, 2022, which is a continuation of U.S. application Ser. No. 16/964,301, filed Jul. 23, 2020, now U.S. Pat. No. 11,317,463, which is a 371 of International Application No. PCT/162019/053876, filed May 10, 2019, which claims the benefit of and priority to U.S. Provisional Patent Application No. 62/669,804, filed May 10, 2018, entitled "RELEASE CAUSE FOR TRANSITION FROM CONNECTED STATE," the disclosures of which are hereby incorporated herein by reference in their entirety.

TECHNICAL FIELD

The present disclosure relates generally to communications, such as in cellular networks, and more particularly to methods, user equipments, and network nodes for handling communications corresponding to suspending a user equipment in a radio access network (RAN).

BACKGROUND

In the new 5G standard, the system and architecture for 5G and various state machines are described. One example of a "state machine" is the connection management state model or CM-state model, described in 3GPP TS 23.501. Generally, connection management includes functions for establishing and releasing signaling connections between a UE and core network node. For 5G, this core network node is called an Access and Mobility Management Function (AMF). A signaling connection over an N1 interface (between a UE and AMF) is used to enable Non-Access-Stratum (NAS) signaling exchange between the UE and the core network. It comprises both the AN (Access Node) signaling connection between the UE and the AN, and an N2 connection, between the AN and the AMF.

In the 5G architecture, there are two CM-states defined, CM-IDLE and CM-CONNECTED. A UE in CM-IDLE has no NAS signaling connection established over N1 to the AMF and in this CM-state, the UE performs cell selection/reselection and PLMN selection. In addition, there is no AN signaling connection or N2/N3 connections for a UE in idle state. If the UE is registered to the network and in CM-IDLE, it may listen to and respond to paging messages from the network. This means that in CM-IDLE the UE is still reachable. If initiated by user/UE, the UE may also perform a service request procedure.

A UE in CM-CONNECTED is a UE that has established an AN signaling connection between the UE and the AN has entered the RRC_CONNECTED state over 3GPP access. Over this connection, the UE can transmit an initial NAS message (for example, a service request) and this message initiates the transition from CM-IDLE to CM-CONNECTED in the AMF. It is also realized that CM-CONNECTED uses an N2 connection, between the AN and the AMF. The reception of an initial N2 message (e.g., N2 Initial UE message) initiates the transition for AMF from CM-IDLE to the CM-CONNECTED state.

In the CM-CONNECTED state, the UE can transmit data, and is ready to enter CM-IDLE, whenever the AN signaling connection is released. The AMF enters CM-IDLE whenever the logical N1 signaling connection and the N3 user plane connection are released.

Similar to the AMF, there is also a state model in the AN, the access network, which is described in detail in the 38.331 RRC specifications. Although, "gNB" generally refers to the access network node, other node types are contemplated, including ng-eNB and an eNB node types. The term "gNB" shall thus be considered as merely an example. From the AS (Access Stratum) perspective, UEs can either be in the RRC_CONNECTED, RRC_INACTIVE or RRC_IDLE states. The mapping between the different state machines, the one in the AN and the one in AMF, is such that CM-CONNECTED can map to either RRC_CONNECTED or RRC_INACTIVE—while CM-IDLE always maps to RRC_IDLE.

A UE is either in RRC_CONNECTED state or in RRC_INACTIVE state when an RRC connection has been established. If this is not the case, i.e. no RRC connection is established, the UE is in RRC_IDLE state. These different states are further described in 3GPP TS 38.331.

In RRC_IDLE, the UE is configured to listen to a paging channel at certain occasions and it performs cell (re)selection procedures and listen to system information. In RRC_INACTIVE, the UE is also listening to paging channel and does cell (re)selection procedures, but in addition, it also maintains a configuration and the configuration is also kept on the network side, such that when needed (e.g., when data arrives to the UE), it doesn't require a complete setup procedure to start transmitting data.

In RRC_CONNECTED, there is transfer of data to or from the UE and the network controls the mobility. This means that the network controls when the UE should handover to other cells. In connected, the UE still monitors the paging channel and it monitors control channels that are associated with whether there is data for the UE or not. It provides channel quality and feedback information to the network and it performs neighbouring cell measurement and reports these measurements to the network.

When a UE is in CM-CONNECTED and RRC_INACTIVE the following applies:
  UE reachability is managed by the RAN, with assistance information from core network;
  UE paging is managed by the RAN;
  UE monitors for paging with UE's CN (5G S-TMSI) and a RAN identifier (I-RNTI).

The AMF, based on network configuration may provide assistance information to the NG-RAN, to assist the NG-RAN's decision whether the UE can be sent to RRC inactive state. RRC inactive assistance information can, for example, include:
  UE specific DRX values;
  the Registration Area provided to the UE, sometimes referred to as TAI-list (TrackingAreaIdentifier List) below;
  Periodic Registration Update timer;
  If the AMF has enabled MICO mode for the UE, an indication that the UE is in MICO mode;
  Information from the UE permanent identifier, as defined in TS 38.304 [50], that allows the RAN to calculate the UE's RAN paging occasions.

The RRC inactive assistance information mentioned above is provided by the AMF during N2 activation with the (new) serving NG-RAN node (i.e. during Registration, Service Request, handover) to assist the NG-RAN's decision whether the UE can be sent to an RRC inactive state. The RRC inactive state is part of RRC state machine, and it is up to the RAN to determine the conditions to enter the RRC inactive state. If any of the parameters included in the RRC inactive assistance information changes as the result of NAS procedure, the AMF shall update the RRC inactive assistance information to the NG-RAN node.

The state of the N2 and N3 reference points are not changed by the UE entering CM-CONNECTED with RRC inactive state. A UE in RRC inactive state is aware of the RAN Notification area (RNA).

RNA configuration in RRC_INACTIVE

A UE in the RRC_INACTIVE state can be configured with an RNA (RAN-based Notification Area), where:
  the RNA can cover a single or multiple cells, and can be smaller than CN Registration area;
  a RAN-based notification area update (RNAU) is periodically sent by the UE and is also sent when the cell reselection procedure of the UE selects a cell that does not belong to the configured RNA.

There are several different alternatives on how the RNA can be configured:
  List of cells:
  A UE is provided an explicit list of cells (one or more) that constitute the RNA.
  List of RAN areas:
  A UE is provided (at least one) RAN area ID, where a RAN area is a subset of a CN Tracking Area;
  A cell broadcasts (at least one) RAN area ID in the system information so that a UE knows which area the cell belongs to.
  List of TAI (Tracking Area Identifiers).

In CM-IDLE, it is the core network that is in charge of UE reachability and the core network does this through configuring a CN registration area that is defined by a set of Tracking Areas (TA)'s. The UE is configured with the CN registration area through a list of Tracking Area Identifiers, TAI's, and this CN Registration area is referred to as "TAI-list".

At transition into CM-CONNECTED with RRC inactive state, the NG-RAN configures the UE with a periodic RAN Notification Area Update timer taking into account the value of the Periodic Registration Update timer value indicated in the RRC Inactive Assistance Information, and uses a guard timer with a value longer than the RAN Notification Area Update timer value provided to the UE.

If the periodic RAN Notification Area Update guard timer expires in RAN, the RAN can initiate the AN Release procedure as specified in TS 23.502 [3].

When the UE is in CM-CONNECTED with RRC inactive state, the UE performs PLMN selection procedures as defined in TS 23.122 [17] for CM-IDLE.

When the UE is CM-CONNECTED with RRC Inactive state, the UE may resume the RRC connection due to:
  Uplink data pending;
  Mobile initiated NAS signalling procedure;
  As a response to RAN paging;
  Notifying the network that it has left the RAN Notification area;
  Upon periodic RAN update timer expiration.

When Resuming, UE will include an identifier to the network that will inform the network node about where the UE context describing the specifics of the UE, e.g., bearers, tracking area, slices, security credentials/keys, and so forth) such that resuming will bring the UE to an RRC_CONNECTED configuration similar to when it was resumed. The Identifier pointing to the UE Context is called I-RNTI, Inactive Radio Network Temporary Identifier. In connection to when the UE is suspended, i.e., it is transitioned from RRC_CONNECTED to RRC_INACTIVE, it is provided with an I-RNTI from the network. The network allocates an I-RNTI when transitioning UE to RRC_INACTIVE and the I-RNTI is used to identify the UE context, i.e., as an identifier of the details stored about the UE in the network while in RRC_INACTIVE.

Much of the behaviour in RRC_INACTIVE is tightly coupled with the ability to connect a radio network to the 5G core network or to connect it to an AMF. Even though there is no new state in the AMF (it is still only CM CONNECTED and CM IDLE) there is still a need for the AMF to know (e.g., to provide the assistance information).

Further, as it is possible to connect the LTE/EUTRA radio network to an AMF or to the 5G core network, all the procedures that are specified for the new radio (NR) should also apply for when the long term evolution (LTE) radio access is connected to 5GC (5G core network). Thus, there is a need to adapt the procedures, such as the RRC protocols, to the LTE radio protocols.

In an LTE standard, there is a procedure for suspending the UE defined in 36.331, which was introduced in Release 13. This is applicable for when LTE connects to EPC, with an MME node directly connected to the eNB, to the core network defined for E-UTRA, as described, e.g., in 3GPP TS 23.401, including NAS procedures described in 3GPP TS 24.301. In a way this suspend procedure applicable for nodes connecting to EPC shares some similarities with RRC_INACTIVE in that the AS context is stored such that a UE can send a resume request and information from last session can be retrieved and doesn't have to be signaled again. In another and very important way, it is not the same as RRC_INACTIVE, as the core network is in a state corresponding to CM-IDLE, i.e., it does not consider the UE connected. This means that it is the core network that does the paging when a UE is suspended in a cell that connects to EPC.

The way to indicate to the UE that it shall be suspended in EPC is to send a release message with a suspend indication, which is modeled as a cause value that means the UE goes to suspend. The specification for this message is described further in 3GPP TS 36.331. It can be noted from the specification that there is a specific release cause defined to suspend the UE such that it can later on be resumed and AS information is stored. This is indicated as "rrc-Suspend-v1320". If the UE is suspended, there is also a resumeIdentity included, which the UE can include if it wants to resume and allow the network to retrieve information about the UE.

SUMMARY

The examples described in the present disclosure can be used to improve signalling relating to suspending a UE, resulting in lower overhead, power savings, and improved efficiency. Other advantages may be readily apparent to one having skill in the art. Certain embodiments may have none, some, or all of the recited advantages.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a method performed by a user equipment for handling communications from one or more network nodes in a radio access network (RAN), the method including: receiving, by a user equipment that is operating in a connected state, an RRC release message from a network node. The method also includes determining, based on an indication in the RRC release message, whether to suspend the user equipment to an inactive state or an idle state, the indication including a presence or absence a suspend configuration field in the RRC release message. The method also includes responsive to determining that the indication is to suspend to an inactive state, transitioning the user equipment to the inactive state.

One general aspect includes a method performed by a network node for providing communications to a user equipment in a radio access network (RAN), the method including: providing, to the user equipment that is operating in a connected state, an RRC Release message. The method also includes triggering, based on an indication in the RRC Release message, a suspension of the user equipment to an inactive state or an idle state, the indication including a presence or absence a suspend configuration field in the RRC release message. The method also includes causing, responsive to the indication being to suspend to an inactive state, the user equipment to transition to the inactive state.

Other embodiments of the above aspects include corresponding computer systems, apparatus, and computer programs recorded on one or more computer storage devices, each configured to perform the actions of the methods.

DETAILED DESCRIPTION

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

In a number of ways, the suspend procedure for LTE is similar to what is going to be introduced for NR and for connecting to the new network with an AMF node. In the case of transitioning to RRC_INACTIVE, there is also a suspend procedure needed, to signal to the UE that it should enter an RRC_INACTIVE state. In NR, for a release message with a suspend indication, there is no release cause included. The inclusion of a suspend configuration in itself could indicate to the UE that the release message means release-to-RRC_INACTIVE. Without the suspend configuration, the release message means Release to RRC_IDLE. In some examples, the suspend configuration is indicated by a field such as RRC-InactiveConfig or suspendConf.

In NR, there is no legacy to consider. This means that a suspend in NR is always a suspend to RRC_INACTIVE. This makes it possible to go thin on distinguishing different cause values. When a corresponding suspend mechanism should be introduced in LTE when connecting to 5GC, which is an existing message, there are advantages in clearly differentiating between the different suspend to an idle state (RRC_IDLE, which is already supported in LTE) and suspend to an inactive state (RRC_INACTIVE), which is new for LTE.

In addition to the above, it is also desired in NR to consider a situation when a release message only should include information that is new, i.e., that is changed from previous signaling (i.e., delta signaling of the RRC release message or at least the suspend configuration). In this situation there may be a confusion in what the suspend configuration in the release message means. For example, if a release message without any suspend configuration indication is received by a UE, it would be ambiguous whether the UE shall release to an idle state, or would it mean that it is a suspend to an inactive with no changes in the suspend configuration.

There currently exist certain challenge(s). In more detail, there is a need to be able to differentiate between suspend to an idle state and suspend to an inactive state when a release message is used to suspend UE. This is particularly important for LTE, as in LTE, there are two different suspend mechanisms For NR and for LTE connected to 5GC, there is also a need to distinguish between a release message that suspend a UE to RRC_INACTIVE with no changes in suspendConfig and a release message that suspends a UE to RRC_IDLE.

Certain aspects of the present disclosure and their embodiments may provide solutions to these or other challenges.

In one aspect, a release cause value is included in the RRC release message in LTE to indicate to a UE that the release is due to transition to RRC_INACTIVE. The indication can be implicit or explicit to enable the UE to distinguish between a suspension to an idle state or to an inactive state. Different embodiments describe the different types of indications, for example the presence of one or two specific parameters only relevant for a given state like inactive, etc. Although we say this is about LTE the fundamental aspect that can be applicable to any RAT (like NR) is the distinction between is the suspend to idle (LTE Release 13 solution) or suspend to inactive, where some actions performed are common, but some are specific for each solution.

In another aspect, a release cause included in the RRC message when the suspend to inactive is signaled in LTE RRC Connection Release message is different than the release cause used for suspending an LTE UE to idle. UE actions upon suspending may be distinguished based on that indication. For example, when suspending to inactive the UE apply some exclusive parameters such as RAN paging configuration, RNA update configurations, periodic RNA timer, etc.

In another aspect, the release cause included is implicit, i.e., by including a new identifier value in suspendConfig that is valid for release to RRC_INACTIVE.

In another aspect, a release cause is included also in the release message when signaled in NR, such that it can allow for not including suspendConfig unless there are changes to the configuration that are to be signaled.

In another aspect, including an explicit or implicit identifier will allow delta-signaling of RRC_INACTIVE-related information that would otherwise not be possible, if there weren't a release cause.

In another aspect, the AS and NAS layers in the UE interact so that the release cause distinguishing the UE to enter RRC_IDLE or RRC_INACTIVE is provided from the lower layers to the upper layers upon the reception of the RRC Release message so that the upper layers can perform an unambiguous transition from a connected state to an idle state or, in the case of the indication to enter an inactive state, to remain in a connected state from an upper layer perspective.

There are, proposed herein, various embodiments which address one or more of the issues disclosed herein, and may provide one or more of the following technical advantage(s).

In some embodiments, the techniques described herein allow for both differentiation of suspend in LTE connecting to both EPC and 5GC. In some embodiments, the techniques described herein allow for indicating to a UE if the release message is a release to RRC_INACTIVE or a release to RRC_IDLE.

Moreover, by including a release cause also in NR, the techniques allow delta-signaling of the configuration parameters that are applicable for RRC_INACTIVE state. The release cause offers the advantage of not including new suspendConfig values where the values are not changed, and thus includes signal parameters in the suspendConfig only when they are changed. This will save in signaling, resulting in lower overhead, power savings, and improved efficiency, among other things.

Figure 1:
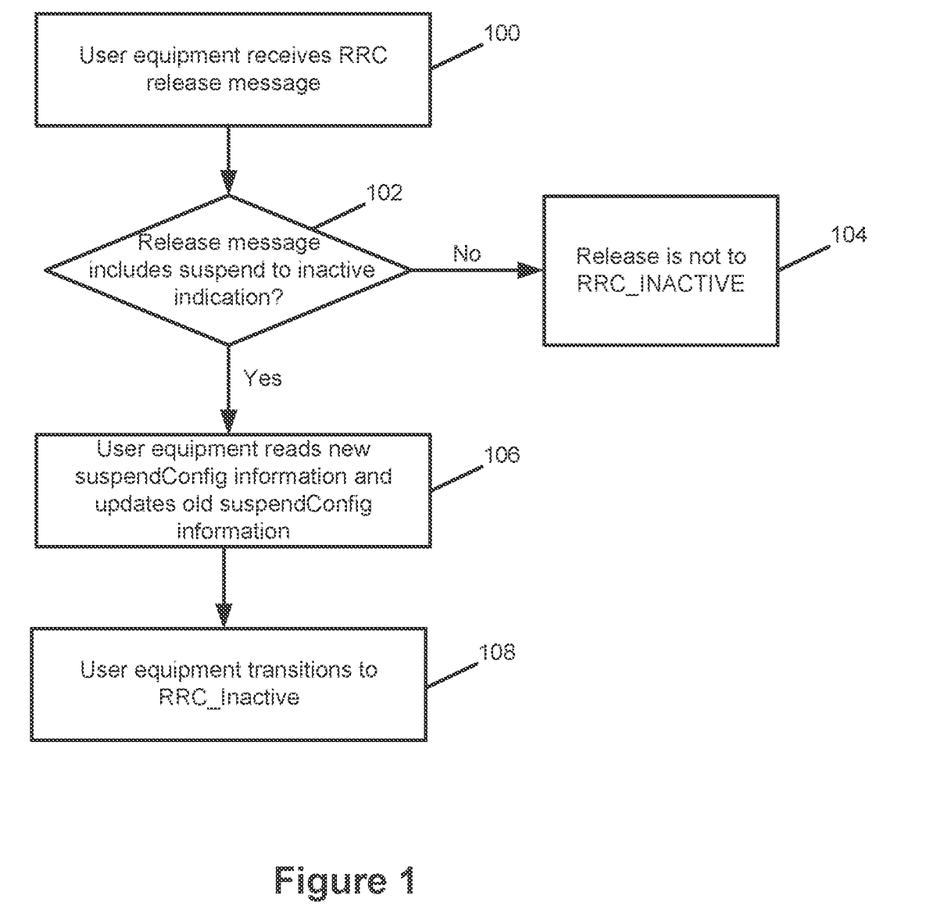
FIG. 1 is a flow diagram illustrating a method for transitioning a user equipment to an inactive state, according to some examples.

FIG. 1 is a flow diagram illustrating an example method for transitioning a user equipment to an RRC_INACTIVE state. For example, the method illustrates signaling in NR connected to 5GC, according to some embodiments.

Step 100, the UE receives a release message from the network. In this example the UE is in RRC_CONNECTED and is about to be released. The reasons for releasing a UE in RRC_CONNECTED can vary. It can for example be due to inactivity, or due to that there is no more data to send and/or receive.

In step 102, the UE reads and interprets the release message. If there is an indication in the release message that the release refers to a suspend to RRC_INACTIVE, then the UE proceeds to step 106. That indication can be a release-cause 'suspend'. If, on the other hand, the release message does not include such an indication (e.g. include another release cause instead), the release message is not about Release to RRC_INACTIVE, but is rather sent for other purposes, this is illustrated in the figure as 104. In some examples, the release is to RRC_IDLE but there could also be other situations when a release message may mean something different. In this embodiment, focus is on whether the indication to RRC_INACTIVE is included.

The indication helps the UE to apply delta signalling to the suspend configuration. If that indication does not exist, the absence of the suspend configuration field could be interpreted as an indication from the network to move the UE to RRC_IDLE. However, based on that indication, the UE knows that the absence of the suspend configuration field means that the UE can apply delta signalling to a previously stored suspend configuration. In other words, the UE can enter RRC_INACTIVE and use the stored suspend configuration when entering RRC_INACTIVE.

If included, in step 106, the UE checks for a new suspendConfig and reads any new potential suspendConfig information that relates to how the UE should behave/be configured in RRC_INACTIVE state.

If suspendConfig information is included, the UE replaces any stored suspendConfig information. For any suspendConfig information not included in the release message, if a UE has a stored version of this information, that is used and applied in the RRC_INACTIVE state. In step 108, UE transitions to RRC_INACTIVE.

It should be noted that these are not all steps that are relevant to make for a UE when transitioning to RRC_INACTIVE. For example, there are aspects related to that the lower level protocols of the UE/UE Access Stratum should communicate with higher layer protocols/UE NON-Access Stratum, that are not illustrated.

The description is applicable in various settings and may include additional signaling.

Figure 2:
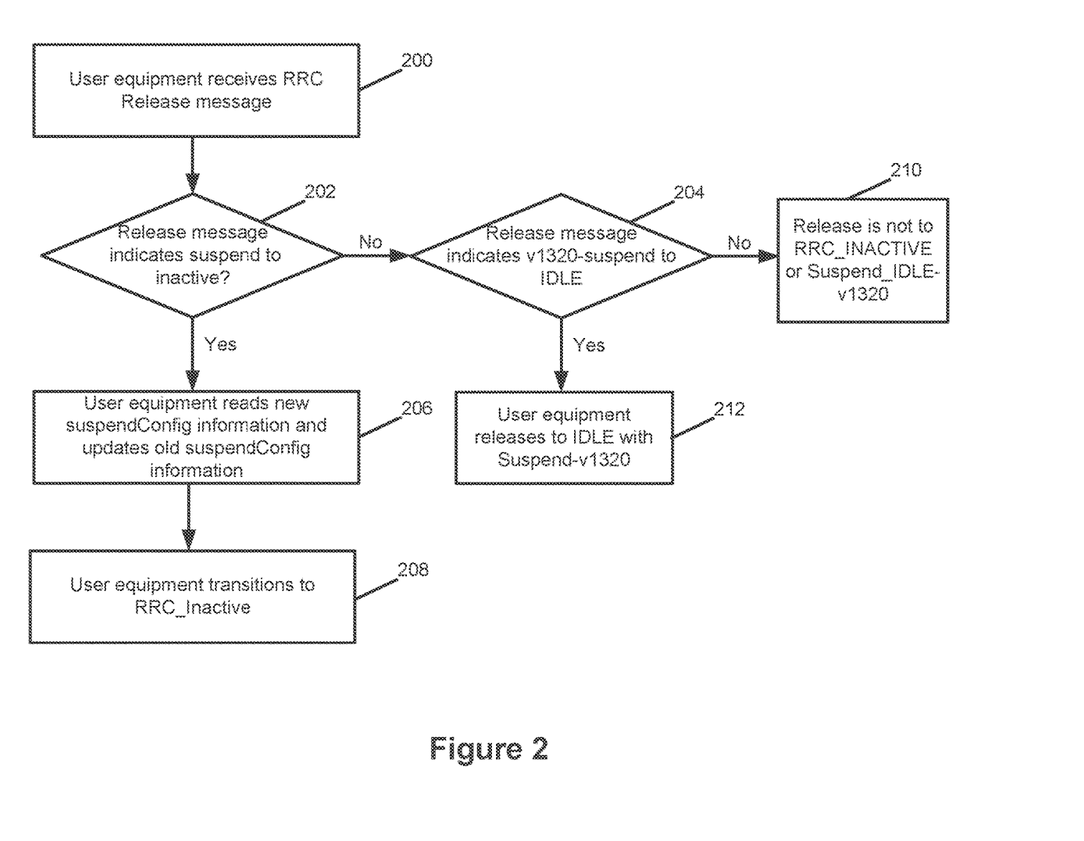
FIG. 2 is a flow diagram illustrating a method for transitioning a user equipment to an inactive state, including an additional cause value indication, according to some examples.

FIG. 2 is a flow diagram illustrating an example method for transitioning a user equipment to an RRC_INACTIVE state, including an additional cause value indication. For example, the method illustrates signaling in LTE connected to 5GC, according to some embodiments.

Illustrating a situation when a UE is using LTE as radio network or any radio network where there could be different solutions to suspend the UE, such as the Release-13 solution (suspend to RRC_IDLE) or the Release-15 solution (Suspend to RRC_INACTIVE). The radio network node can connect to either EPC (an MME+Serving Gateway) or a 5G Core Network (to an AMF+a User Plane Function) or both.

In the situation an LTE UE is receiving an RRC Release message 200, it can first, in step 202 consider if the Release message includes an RRC Inactive Indication (which can be implemented as a release cause e.g. 'suspend-inactive'). If this is not the case, it can consider whether there is an indication to suspend to IDLE, this is step 204. In the figure, it is illustrated as a v1320 cause value, but this cause value may be equally applicable also to other standard versions than standard release 13. In this situation, it may be called suspend cause v15 or suspend cause b16 or anything else. It is noted that this is a suspend to idle rather than a suspend to inactive, which was what was determined in step 202. If there is no suspend indication to IDLE either, then it is concluded in step 210. This may mean that the UE is released to IDLE without any need to save any AS. If there was a suspend-to-IDLE indication in step 204, then in step 204, the UE releases to IDLE and stores the AS configuration according to what is standardized for this procedure.

If the release to inactive indication in step 202 was included, then this indication would, in a similar way as for FIG. 1 and NR, mean that the UE should check for a new suspendConfig and read any new potential suspendConfig information that relates to how the UE should behave/be configured in RRC INACTIVE state in step 206. In step 208, the UE transitions to RRC_INACTIVE.

In connection to both example procedures above, it has been stated in step 102/202 that the UE should check the release message to determine if it includes a suspend to RRC_INACTIVE indication. Examples of the indication are discussed in further detail below.

In one aspect of the present disclosure, the suspend-to-RRC_INACTIVE indication is a cause value included in the RRC signaling.

Taking the signaling specified for LTE as example, the suspend to RRC_INACTIVE may be added to a set of already existing release cause values or to include a completely different set of ReleaseCauses for LTE, to use in release messages, when a UE is connected to 5GC. In other examples, there could be situations when a UE that connects to 5GC actually has two different suspend mechanisms available for selection.

In some examples, the ReleaseCause-5G is a 2-bit field, (4 values) but it can of course be of different size. Similarly, for NR connected to 5GC, a release cause may be included similar to LTE connected to 5GC. It should be noted that in both cases above, both for NR and for LTE, there can of course be other cause values. The technique is applicable to presence of suspend causes, both in situations where there are other causes or not.

An alternative way of indicating a release to RRC_INACTIVE can, according to another aspect of the present disclosure, be based on presence or absence of the suspend configuration information. A suspend configuration informs the UE how to configure/Behave in RRC_INACTIVE state and can both be called different things and it can include more or less fields. In some examples, the suspend configuration includes resumeIdentity, pagingCycle, ran-NotificationAreaInfo, periodic-RNAU-timer, and nextHopChainingCount information elements. A paging cycle is a repetition frequency indicating time instances when the UE shall listen for pages from the network. The suspend configuration, in this example, further includes the RNA area and a timer for periodic updates of RNAU. The suspend configuration, in this example, also includes an NCC NextHopChaining count value which is a security-related parameter.

One way of indicating to suspend to RRC_INACTIVE is to include the resumeIdentity in the suspend configuration message. A criteria in e.g., 102/202 above would then be that if the resumeIdentity is included, it is a suspend to RRC_INACTIVE. If the resumeIdentity is not included, and the suspend configuration is either empty or not present in the release message, then it is a release to RRC_IDLE, or it is a suspend to RRC_IDLE or it is at least not release to RRC_INACTIVE.

According to one aspect of the present disclosure, there is thus then only one information element that is mandatory if the suspend configuration is included in the release message and that is the resumeIdentity. This means that the rest of the information elements (e.g., pagingCycle, ran-NotificationAreaInfo, periodic-RNAU-timer, and nextHopChainingCount) could be optionally included. If they are not included, it could be possible to allow the UE to use previously received information for any of these information elements without the need to signal them again.

It should be noted that both options can be equally applicable both for LTE and NR when performing transitions to RRC_INACTIVE and when such transition is signaled or triggered by a release message, as described above.

In some examples, if an RRC release message (e.g., RRCRelease) includes a suspend configuration field (e.g., suspendConfig, RRC-InactiveConfig), the user equipment stores the following parameters of the suspend configuration: resumeIdentity, nextHopChainingCount, PagingCycle and ran-NotificationAreaInfo information, if these are not already stored. Delta signalling is applied to resumeIdentity, nextHopChainingCount, PagingCycle and ran-NotificationAreaInfo, if they are stored. If the RRC release message does not include the suspend configuration filed, the user equipment uses the values stored at the UE for the following parameters of the suspend configuration: resumeIdentity, nextHopChainingCount, PagingCycle and ran-NotificationAreaInfo.

Figure 3:
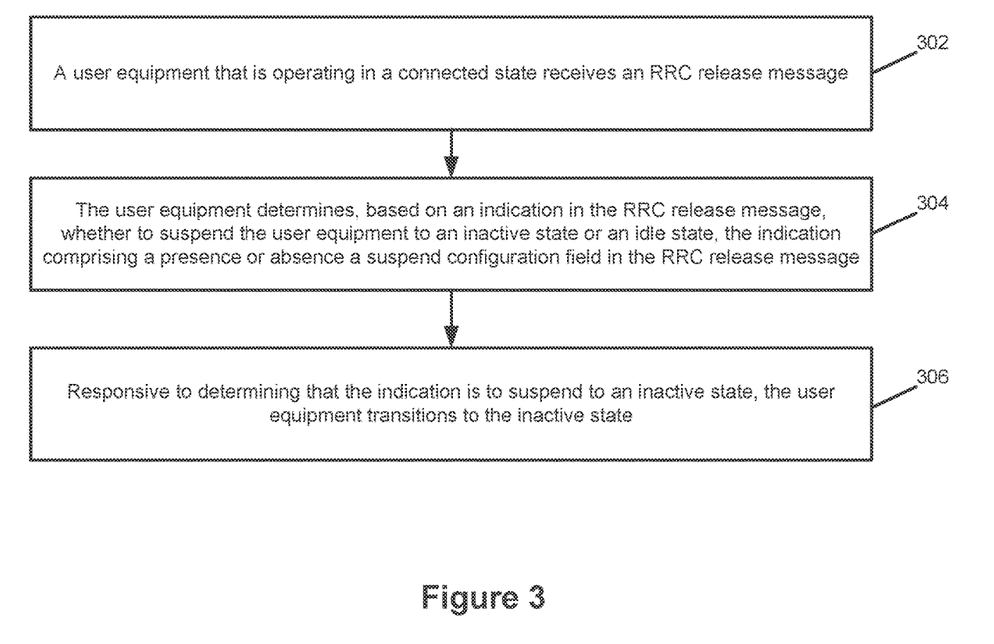
FIG. 3 is a flow diagram illustrating a method performed by a user equipment for transitioning to an inactive state or an idle state, according to some examples.

FIG. 3 is a flow diagram illustrating an example method performed by a user equipment for transitioning to an inactive state or an idle state.

At step 302, user equipment that is operating in a connected state receives an RRC release message. In the present example, the connected state is the RRC_CONNECTED state.

At step 304, the user equipment determines, based on an indication in the RRC release message, whether to suspend the user equipment to an inactive state or an idle state, the indication comprising a presence or absence a suspend configuration field in the RRC release message. In the present example, the inactive state is the RRC_INACTIVE state and the idle state is the RRC_IDLE state.

In some examples, the indication to suspend the user equipment to the inactive state includes the presence of a suspend configuration field in the RRC release message and the indication to suspend the user equipment to the idle state comprises the absence of a suspend configuration field in the RRC release message. The suspend configuration field may be, for example, suspendConf or RRC-InactiveConfig. In some examples, the suspend configuration field indicates a configuration corresponding to the inactive state.

At step 306, responsive to determining that the indication is to suspend to an inactive state, the user equipment transitions to the inactive state. For example, the transitioning of the user equipment to the inactive state may be performed during a connection of the user equipment to a 5G core network from a long term evolution (LTE) network.

In some examples, the user equipment applies delta signaling corresponding to a suspend configuration indicated by the suspend configuration field, where the delta signaling includes receiving changed suspend configuration information indicated by the suspend configuration field and accessing unchanged suspend configuration information from previously stored suspend configuration information on the user equipment. In some examples, the suspend configuration includes RAN Notification Area (RNA) information, and delta signalling is applied to update this RNA information in the suspend configuration.

Figure 4:
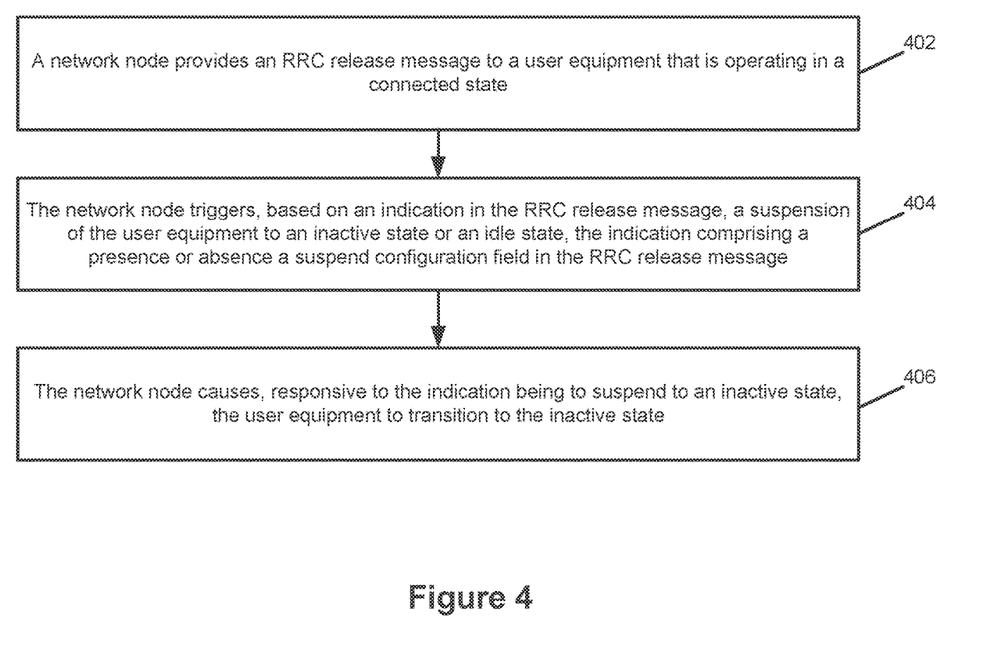
FIG. 4 is a flow diagram illustrating a method performed by a network node for transitioning a user equipment to an inactive state or an idle state, according to some examples.

FIG. 4 is a flow diagram illustrating an example method performed by a network node for transitioning a user equipment to an inactive state or an idle state, according to some examples.

At step 402, a network node provides an RRC release message to a user equipment that is operating in a connected state. In the present example, the connected state is the RRC_CONNECTED state.

At step 404, the network node triggers, based on an indication in the RRC release message, a suspension of the user equipment to an inactive state or an idle state, the indication comprising a presence or absence a suspend configuration field in the RRC release message. In the present example, the inactive state is the RRC_INACTIVE state and the idle state is the RRC_IDLE state.

In some examples, the indication to suspend the user equipment to the inactive state includes the presence of a suspend configuration field in the RRC release message and the indication to suspend the user equipment to the idle state comprises the absence of a suspend configuration field in the RRC release message. The suspend configuration field may be, for example, suspendConf or RRC-InactiveConfig. In some examples, the suspend configuration field indicates a configuration corresponding to the inactive state.

At step 406, the network node causes, responsive to the indication being to suspend to an inactive state, the user equipment to transition to the inactive state. For example, the transitioning of the user equipment to the inactive state may be performed during a connection of the user equipment to a 5G core network from a long term evolution (LTE) network.

In some examples, the user equipment applies delta signaling corresponding to a suspend configuration indicated by the suspend configuration field, where the delta signaling includes providing changed suspend configuration information indicated by the suspend configuration field, wherein the user equipment accesses unchanged suspend configuration information from previously stored suspend configuration information on the user equipment. In some examples, the suspend configuration includes RAN Notification Area (RNA) information, and delta signalling is applied to update this RNA information in the suspend configuration.

Figure 5:
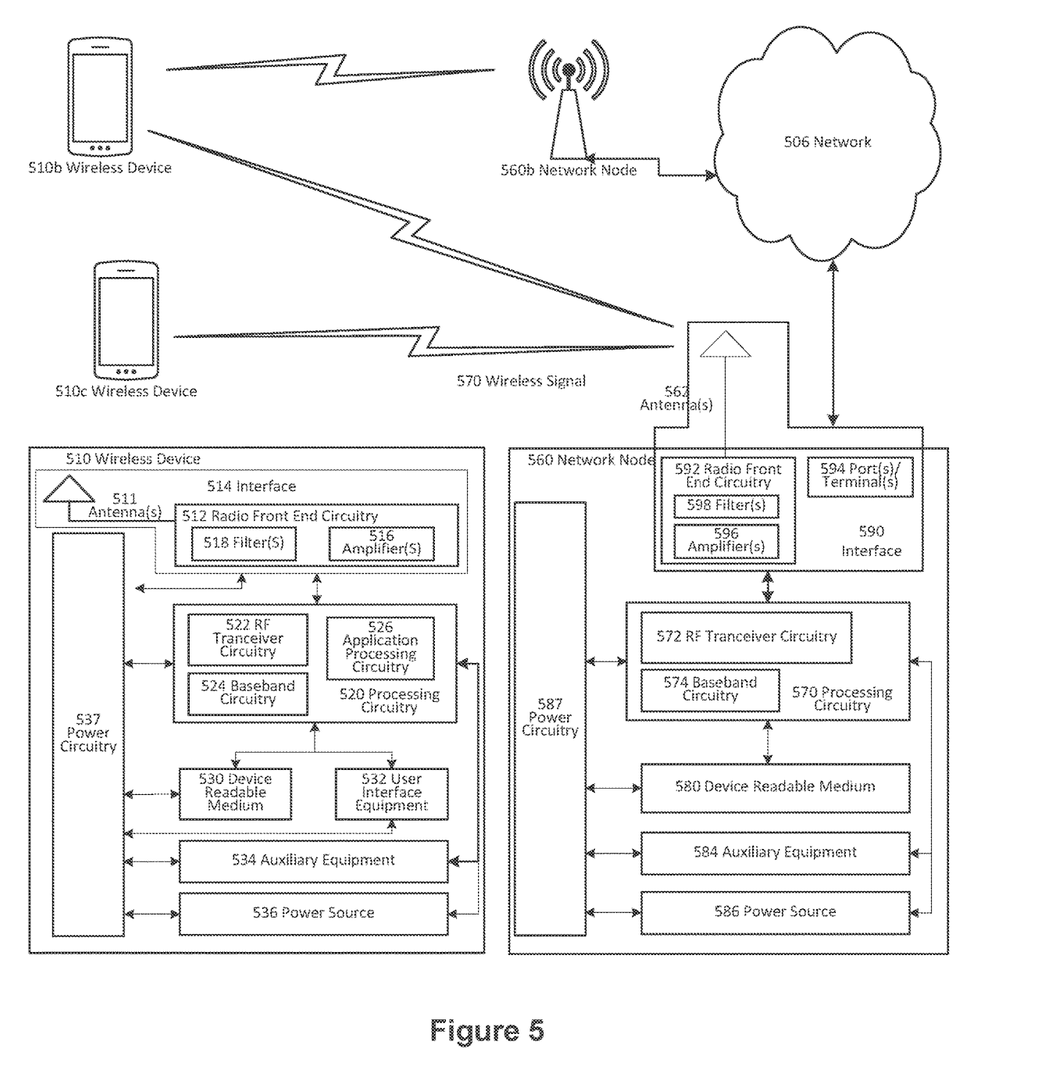
FIG. 5 is a block diagram illustrating a wireless network, according to some examples.

FIG. 5 is a block diagram illustrating an example wireless network. Although the subject matter described herein may be implemented in any appropriate type of system using any suitable components, the embodiments disclosed herein are described in relation to a wireless network, such as the example wireless network illustrated in FIG. 5. For simplicity, the wireless network of FIG. 5 only depicts network 506, network nodes 560 and 560b, and WDs 510, 510b, and 510c. In practice, a wireless network may further include any additional elements suitable to support communication between wireless devices or between a wireless device and another communication device, such as a landline telephone, a service provider, or any other network node or end device. Of the illustrated components, network node 560 and wireless device (WD) 510 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or Zig Bee standards.

Network 506 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 560 and WD 510 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 5, network node 560 includes processing circuitry 570, device readable medium 580, interface 590, auxiliary equipment 584, power source 586, power circuitry 587, and antenna 562. Although network node 560 illustrated in the example wireless network of FIG. 5 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 560 are depicted as single boxes located within a larger box, or nested within multiple boxes, in practice, a network node may comprise multiple different physical components that make up a single illustrated component (e.g., device readable medium 580 may comprise multiple separate hard drives as well as multiple RAM modules).

Similarly, network node 560 may be composed of multiple physically separate components (e.g., a NodeB component and a RNC component, or a BTS component and a BSC component, etc.), which may each have their own respective components. In certain scenarios in which network node 560 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 560 may be configured to support multiple radio access technologies (RATs). In such embodiments, some components may be duplicated (e.g., separate device readable medium 580 for the different RATs) and some components may be reused (e.g., the same antenna 562 may be shared by the RATs). Network node 560 may also include multiple sets of the various illustrated components for different wireless technologies integrated into network node 560, such as, for example, GSM, WCDMA, LTE, NR, WiFi, or Bluetooth wireless technologies. These wireless technologies may be integrated into the same or different chip or set of chips and other components within network node 560.

Processing circuitry 570 is configured to perform any determining, calculating, or similar operations (e.g., certain obtaining operations) described herein as being provided by a network node. These operations performed by processing circuitry 570 may include processing information obtained by processing circuitry 570 by, for example, converting the obtained information into other information, comparing the obtained information or converted information to information stored in the network node, and/or performing one or more operations based on the obtained information or converted information, and as a result of said processing making a determination.

Processing circuitry 570 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 560 components, such as device readable medium 580, network node 560 functionality. For example, processing circuitry 570 may execute instructions stored in device readable medium 580 or in memory within processing circuitry 570. Such functionality may include providing any of the various wireless features, functions, or benefits discussed herein. In some embodiments, processing circuitry 570 may include a system on a chip (SOC).

In some embodiments, processing circuitry 570 may include one or more of radio frequency (RF) transceiver circuitry 572 and baseband processing circuitry 574. In some embodiments, radio frequency (RF) transceiver circuitry 572 and baseband processing circuitry 574 may be on separate chips (or sets of chips), boards, or units, such as radio units and digital units. In alternative embodiments, part or all of RF transceiver circuitry 572 and baseband processing circuitry 574 may be on the same chip or set of chips, boards, or units In certain embodiments, some or all of the functionality described herein as being provided by a network node, base station, eNB or other such network device may be performed by processing circuitry 570 executing instructions stored on device readable medium 580 or memory within processing circuitry 570. In alternative embodiments, some or all of the functionality may be provided by processing circuitry 570 without executing instructions stored on a separate or discrete device readable medium, such as in a hard-wired manner. In any of those embodiments, whether executing instructions stored on a device readable storage medium or not, processing circuitry 570 can be configured to perform the described functionality. The benefits provided by such functionality are not limited to processing circuitry 570 alone or to other components of network node 560, but are enjoyed by network node 560 as a whole, and/or by end users and the wireless network generally.

Device readable medium 580 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 570. Device readable medium 580 may store any suitable instructions, data or information, including a computer program, software, an application including one or more of logic, rules, code, tables, etc. and/or other instructions capable of being executed by processing circuitry 570 and, utilized by network node 560. Device readable medium 580 may be used to store any calculations made by processing circuitry 570 and/or any data received via interface 590. In some embodiments, processing circuitry 570 and device readable medium 580 may be considered to be integrated.

Interface 590 is used in the wired or wireless communication of signalling and/or data between network node 560, network 506, and/or WDs 510. As illustrated, interface 590 comprises port(s)/terminal(s) 594 to send and receive data, for example to and from network 506 over a wired connection. Interface 590 also includes radio front end circuitry 592 that may be coupled to, or in certain embodiments a part of, antenna 562. Radio front end circuitry 592 comprises filters 598 and amplifiers 596. Radio front end circuitry 592 may be connected to antenna 562 and processing circuitry 570. Radio front end circuitry may be configured to condition signals communicated between antenna 562 and processing circuitry 570. Radio front end circuitry 592 may receive digital data that is to be sent out to other network nodes or WDs via a wireless connection. Radio front end circuitry 592 may convert the digital data into a radio signal having the appropriate channel and bandwidth parameters using a combination of filters 598 and/or amplifiers 596. The radio signal may then be transmitted via antenna 562. Similarly, when receiving data, antenna 562 may collect radio signals which are then converted into digital data by radio front end circuitry 592. The digital data may be passed to processing circuitry 570. In other embodiments, the interface may comprise different components and/or different combinations of components.

In certain alternative embodiments, network node 560 may not include separate radio front end circuitry 592, instead, processing circuitry 570 may comprise radio front end circuitry and may be connected to antenna 562 without separate radio front end circuitry 592. Similarly, in some embodiments, all or some of RF transceiver circuitry 572 may be considered a part of interface 590. In still other embodiments, interface 590 may include one or more ports or terminals 594, radio front end circuitry 592, and RF transceiver circuitry 572, as part of a radio unit (not shown), and interface 590 may communicate with baseband processing circuitry 574, which is part of a digital unit (not shown).

Antenna 562 may include one or more antennas, or antenna arrays, configured to send and/or receive wireless signals. Antenna 562 may be coupled to radio front end circuitry 590 and may be any type of antenna capable of transmitting and receiving data and/or signals wirelessly. In some embodiments, antenna 562 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 562 may be separate from network node 560 and may be connectable to network node 560 through an interface or port.

Antenna 562, interface 590, and/or processing circuitry 570 may be configured to perform any receiving operations and/or certain obtaining operations described herein as being performed by a network node. Any information, data and/or signals may be received from a wireless device, another network node and/or any other network equipment. Similarly, antenna 562, interface 590, and/or processing circuitry 570 may be configured to perform any transmitting operations described herein as being performed by a network node. Any information, data and/or signals may be transmitted to a wireless device, another network node and/or any other network equipment.

Power circuitry 587 may comprise, or be coupled to, power management circuitry and is configured to supply the components of network node 560 with power for performing the functionality described herein. Power circuitry 587 may receive power from power source 586. Power source 586 and/or power circuitry 587 may be configured to provide power to the various components of network node 560 in a form suitable for the respective components (e.g., at a voltage and current level needed for each respective component). Power source 586 may either be included in, or external to, power circuitry 587 and/or network node 560. For example, network node 560 may be connectable to an external power source (e.g., an electricity outlet) via an input circuitry or interface such as an electrical cable, whereby the external power source supplies power to power circuitry 587. As a further example, power source 586 may comprise a source of power in the form of a battery or battery pack which is connected to, or integrated in, power circuitry 587. The battery may provide backup power should the external power source fail. Other types of power sources, such as photovoltaic devices, may also be used.

Alternative embodiments of network node 560 may include additional components beyond those shown in FIG. 5 that may be responsible for providing certain aspects of the network node's functionality, including any of the functionality described herein and/or any functionality necessary to support the subject matter described herein. For example, network node 560 may include user interface equipment to allow input of information into network node 560 and to allow output of information from network node 560. This may allow a user to perform diagnostic, maintenance, repair, and other administrative functions for network node 560.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 510 includes antenna 511, interface 514, processing circuitry 520, device readable medium 530, user interface equipment 532, auxiliary equipment 534, power source 536 and power circuitry 537. WD 510 may include multiple sets of one or more of the illustrated components for different wireless technologies supported by WD 510, such as, for example, GSM, WCDMA, LTE, NR, WiFi, WiMAX, or Bluetooth wireless technologies, just to mention a few. These wireless technologies may be integrated into the same or different chips or set of chips as other components within WD 510.

Antenna 511 may include one or more antennas or antenna arrays, configured to send and/or receive wireless signals, and is connected to interface 514. In certain alternative embodiments, antenna 511 may be separate from WD 510 and be connectable to WD 510 through an interface or port. Antenna 511, interface 514, and/or processing circuitry 520 may be configured to perform any receiving or transmitting operations described herein as being performed by a WD. Any information, data and/or signals may be received from a network node and/or another WD. In some embodiments, radio front end circuitry and/or antenna 511 may be considered an interface.

As illustrated, interface 514 comprises radio front end circuitry 512 and antenna 511. Radio front end circuitry 512 comprise one or more filters 518 and amplifiers 516. Radio front end circuitry 514 is connected to antenna 511 and processing circuitry 520, and is configured to condition signals communicated between antenna 511 and processing circuitry 520. Radio front end circuitry 512 may be coupled to or a part of antenna 511. In some embodiments, WD 510 may not include separate radio front end circuitry 512; rather, processing circuitry 520 may comprise radio front end circuitry and may be connected to antenna 511. Similarly, in some embodiments, some or all of RF transceiver circuitry 522 may be considered a part of interface 514. Radio front end circuitry 512 may receive digital data that is to be sent out to other network nodes or WDs via a wireless connection. Radio front end circuitry 512 may convert the digital data into a radio signal having the appropriate channel and bandwidth parameters using a combination of filters 518 and/or amplifiers 516. The radio signal may then be transmitted via antenna 511. Similarly, when receiving data, antenna 511 may collect radio signals which are then converted into digital data by radio front end circuitry 512. The digital data may be passed to processing circuitry 520. In other embodiments, the interface may comprise different components and/or different combinations of components.

Processing circuitry 520 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 510 components, such as device readable medium 530, WD 510 functionality. Such functionality may include providing any of the various wireless features or benefits discussed herein. For example, processing circuitry 520 may execute instructions stored in device readable medium 530 or in memory within processing circuitry 520 to provide the functionality disclosed herein.

As illustrated, processing circuitry 520 includes one or more of RF transceiver circuitry 522, baseband processing circuitry 524, and application processing circuitry 526. In other embodiments, the processing circuitry may comprise different components and/or different combinations of components. In certain embodiments processing circuitry 520 of WD 510 may comprise a SOC. In some embodiments, RF transceiver circuitry 522, baseband processing circuitry 524, and application processing circuitry 526 may be on separate chips or sets of chips. In alternative embodiments, part or all of baseband processing circuitry 524 and application processing circuitry 526 may be combined into one chip or set of chips, and RF transceiver circuitry 522 may be on a separate chip or set of chips. In still alternative embodiments, part or all of RF transceiver circuitry 522 and baseband processing circuitry 524 may be on the same chip or set of chips, and application processing circuitry 526 may be on a separate chip or set of chips. In yet other alternative embodiments, part or all of RF transceiver circuitry 522, baseband processing circuitry 524, and application processing circuitry 526 may be combined in the same chip or set of chips. In some embodiments, RF transceiver circuitry 522 may be a part of interface 514. RF transceiver circuitry 522 may condition RF signals for processing circuitry 520.

In certain embodiments, some or all of the functionality described herein as being performed by a WD may be provided by processing circuitry 520 executing instructions stored on device readable medium 530, which in certain embodiments may be a computer-readable storage medium. In alternative embodiments, some or all of the functionality may be provided by processing circuitry 520 without executing instructions stored on a separate or discrete device readable storage medium, such as in a hard-wired manner. In any of those particular embodiments, whether executing instructions stored on a device readable storage medium or not, processing circuitry 520 can be configured to perform the described functionality. The benefits provided by such functionality are not limited to processing circuitry 520 alone or to other components of WD 510, but are enjoyed by WD 510 as a whole, and/or by end users and the wireless network generally.

Processing circuitry 520 may be configured to perform any determining, calculating, or similar operations (e.g., certain obtaining operations) described herein as being performed by a WD. These operations, as performed by processing circuitry 520, may include processing information obtained by processing circuitry 520 by, for example, converting the obtained information into other information, comparing the obtained information or converted information to information stored by WD 510, and/or performing one or more operations based on the obtained information or converted information, and as a result of said processing making a determination.

Device readable medium 530 may be operable to store a computer program, software, an application including one or more of logic, rules, code, tables, etc. and/or other instructions capable of being executed by processing circuitry 520. Device readable medium 530 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 520. In some embodiments, processing circuitry 520 and device readable medium 530 may be considered to be integrated.

User interface equipment 532 may provide components that allow for a human user to interact with WD 510. Such interaction may be of many forms, such as visual, audial, tactile, etc. User interface equipment 532 may be operable to produce output to the user and to allow the user to provide input to WD 510. The type of interaction may vary depending on the type of user interface equipment 532 installed in WD 510. For example, if WD 510 is a smart phone, the interaction may be via a touch screen; if WD 510 is a smart meter, the interaction may be through a screen that provides usage (e.g., the number of gallons used) or a speaker that provides an audible alert (e.g., if smoke is detected). User interface equipment 532 may include input interfaces, devices and circuits, and output interfaces, devices and circuits. User interface equipment 532 is configured to allow input of information into WD 510, and is connected to processing circuitry 520 to allow processing circuitry 520 to process the input information. User interface equipment 532 may include, for example, a microphone, a proximity or other sensor, keys/buttons, a touch display, one or more cameras, a USB port, or other input circuitry. User interface equipment 532 is also configured to allow output of information from WD 510, and to allow processing circuitry 520 to output information from WD 510. User interface equipment 532 may include, for example, a speaker, a display, vibrating circuitry, a USB port, a headphone interface, or other output circuitry. Using one or more input and output interfaces, devices, and circuits, of user interface equipment 532, WD 510 may communicate with end users and/or the wireless network, and allow them to benefit from the functionality described herein.

Auxiliary equipment 534 is operable to provide more specific functionality which may not be generally performed by WDs. This may comprise specialized sensors for doing measurements for various purposes, interfaces for additional types of communication such as wired communications etc.

The inclusion and type of components of auxiliary equipment 534 may vary depending on the embodiment and/or scenario.

Power source 536 may, in some embodiments, be in the form of a battery or battery pack. Other types of power sources, such as an external power source (e.g., an electricity outlet), photovoltaic devices or power cells, may also be used. WD 510 may further comprise power circuitry 537 for delivering power from power source 536 to the various parts of WD 510 which need power from power source 536 to carry out any functionality described or indicated herein. Power circuitry 537 may in certain embodiments comprise power management circuitry. Power circuitry 537 may additionally or alternatively be operable to receive power from an external power source; in which case WD 510 may be connectable to the external power source (such as an electricity outlet) via input circuitry or an interface such as an electrical power cable. Power circuitry 537 may also in certain embodiments be operable to deliver power from an external power source to power source 536. This may be, for example, for the charging of power source 536. Power circuitry 537 may perform any formatting, converting, or other modification to the power from power source 536 to make the power suitable for the respective components of WD 510 to which power is supplied.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

The invention claimed is:

1. A method performed by a network node, the method comprising:
providing, to a user equipment, a radio resource control (RRC) release message comprising an indication, wherein the indication comprises a suspend configuration field;
causing, based on the suspend configuration field, the user equipment to apply delta signalling corresponding to a suspend configuration; and
causing, responsive to the indication being to suspend to an inactive state, the user equipment to transition to the inactive state.

2. The method of claim 1, wherein the suspend configuration field indicates a configuration corresponding to the inactive state.

3. The method of claim 1, wherein causing the user equipment to apply delta signalling comprises:
providing, to the user equipment, changed suspend configuration information indicated by the suspend configuration field; and
causing the user equipment to access unchanged suspend configuration information from previously stored suspend configuration information on the user equipment.

4. The method of claim 1, wherein the suspend configuration includes RAN Notification Area (RNA) information.

5. The method of claim 1, wherein the delta signalling is applied to update RAN Notification Area (RNA) information in the suspend configuration.

6. The method of claim 1, wherein causing the user equipment to transition to the inactive state is performed during a connection of the user equipment to a 5G core network from a long term evolution (LTE) network.

7. The method of claim 1, wherein the RRC release message is provided to the user equipment while the user equipment is operating in a connected state.

8. A non-transitory computer readable medium storing computer readable program code executable by processing circuitry of a network node to perform operations comprising:
providing, to a user equipment, a radio resource control (RRC) release message comprising an indication, wherein the indication comprises a suspend configuration field;
causing, based on the suspend configuration field, the user equipment to apply delta signalling corresponding to a suspend configuration; and
causing, responsive to the indication being to suspend to an inactive state, the user equipment to transition to the inactive state.

9. The non-transitory computer readable medium of claim 8, wherein the suspend configuration field indicates a configuration corresponding to the inactive state.

10. The non-transitory computer readable medium of claim 8, wherein causing the user equipment to apply delta signalling comprises:
providing, to the user equipment, changed suspend configuration information indicated by the suspend configuration field; and
causing the user equipment to access unchanged suspend configuration information from previously stored suspend configuration information on the user equipment.

11. The non-transitory computer readable medium of claim 8, wherein the suspend configuration includes RAN Notification Area (RNA) information.

12. The non-transitory computer readable medium of claim 8, wherein the delta signalling is applied to update RAN Notification Area (RNA) information in the suspend configuration.

13. The non-transitory computer readable medium of claim 8, wherein causing the user equipment to transition to the inactive state is performed during a connection of the user equipment to a 5G core network from a long term evolution (LTE) network.

14. The non-transitory computer readable medium of claim 8, wherein the RRC release message is provided to the user equipment while the user equipment is operating in a connected state.

15. A network node comprising:
a non-transitory memory; and
processing circuitry coupled to the non-transitory memory and configured to read instructions from the non-transitory memory to perform operations comprising:

providing, to a user equipment, a radio resource control (RRC) release message comprising an indication, wherein the indication comprises a suspend configuration field;

causing, based on the suspend configuration field, the user equipment to apply delta signalling corresponding to a suspend configuration; and causing, responsive to the indication being to suspend to an inactive state, the user equipment to transition to the inactive state.

16. The network node of claim 15, wherein the suspend configuration field indicates a configuration corresponding to the inactive state.

17. The network node of claim 15, wherein causing the user equipment to apply delta signalling comprises:

providing, to the user equipment, changed suspend configuration information indicated by the suspend configuration field; and causing the user equipment to access unchanged suspend configuration information from previously stored suspend configuration information on the user equipment.

18. The network node of claim 15, wherein the suspend configuration includes RAN Notification Area (RNA) information.

19. The network node of claim 15, wherein the delta signalling is applied to update RAN Notification Area (RNA) information in the suspend configuration.

20. The network node of claim 15, wherein the RRC release message is provided to the user equipment while the user equipment is operating in a connected state.

* * * * *